United States Patent [19]

Miller

[11] 4,215,543

[45] Aug. 5, 1980

[54] METHOD AND APPARATUS FOR LINEAR AND NONLINEAR CONTROL OF A HYDRAULIC PRESS

[75] Inventor: John C. Miller, Algoma, Wis.

[73] Assignee: C. A. Lawton Company, Depere, Wis.

[21] Appl. No.: 28,225

[22] Filed: Apr. 9, 1979

[51] Int. Cl.[2] .............................................. F16H 39/46

[52] U.S. Cl. .......................................... 60/327; 60/445; 60/446; 60/452; 60/DIG. 2

[58] Field of Search ................. 60/327, 381, 383, 391, 60/394, 445, 446, 452, 468, 494, DIG. 2

[56] References Cited

U.S. PATENT DOCUMENTS

| | | | |
|---|---|---|---|
| 2,260,175 | 10/1941 | Ernst et al. | 60/381 X |
| 3,535,876 | 10/1970 | Gulrajani | 60/445 X |
| 3,826,090 | 7/1974 | Bahl | 60/445 |

*Primary Examiner*—Edgar W. Geoghegan
*Attorney, Agent, or Firm*—Hill, Van Santen, Steadman, Chiara & Simpson

[57] ABSTRACT

A method and apparatus for linear and nonlinear control of a hydraulic press is provided with a feedback loop allowing the operation of a variable displacement pump to be selectively controlled with respect to either hydraulic pressure moving a piston in a cylinder, or the velocity of the piston. During controlled movement of the piston, a directional valve blocks a pump compensator so that the pump operates as a fixed displacement pump to provide fast response to feedback signals. Simultaneously, the directional valve connects a proportional pressure controller to a relief valve. During a period when the piston is maintained in fixed position, the directional valve is switched so that the proportional pressure controller now controls the pump compensator and the relief valve is blocked, so that energy consumption is substantially reduced. Zero or low piston velocity is obtained by means of a sequence valve which blocks hydraulic supply to the piston below a designated pressure to eliminate the influence of inherent system pressure which may cause piston movement in the absence of sufficient material pressure.

14 Claims, 3 Drawing Figures

METHOD AND APPARATUS FOR LINEAR AND NONLINEAR CONTROL OF A HYDRAULIC PRESS

BACKGROUND OF THE INVENTION

The present invention relates to a method and apparatus for linear and nonlinear control of a hydraulic press, and more particularly to a means for controlling a thermoset process.

Hydraulically operated thermoset presses are widely used in many materials-molding applications. Although different types of molding processes, such as compression, transfer, or injection molding, may be employed depending upon the nature of the molded material and the type of product to be formed, each process generally contemplates filling a cavity with a material, applying pressure to the material, and maintaining the pressure for a "set" or "cure" period.

Pressure is generally applied by a press consisting of a hydraulically operated piston movable in a cylinder containing the material to be molded. It is normally desirable to control the velocity of the material flowing through a mold cavity followed by control of the material pressure during the final stages of the filling of the cavity. Due to the physical characteristics of various types of molding materials as well as the complicated shapes of parts to be molded, nonlinear movement of the piston is required in order to achieve best results. Hydraulic presses currently in the art control either the pressure in front of the piston head or the velocity of the piston in order to control piston movement. Generally such control is accomplished be entering a "profile" of the desired piston movement with respect to distance or time into an electronic control device.

Such presses and associated control devices currently in use have the disadvantage of not being able to achieve zero or low velocities if the resistance of the material to movement is lower than the force developed by the minimum operating pressure of the system, which is normally in the range of 100–150 p.s.i. This pressure is developed from the resistance to the flow of hydraulic fluid from the pump to a tank as a result of pressure drops occurring in the lines and valves. Because the hold portion of the cycle generally constitutes the major portion of a cycle, a large amount of energy is wasted, due to the use of a fixed volume pump.

In accordance with the principles of the present invention a method and apparatus for linear and nonlinear control of hydraulic presses utilizes a sequence valve which is set just above a minimum operating pressure of the system, to prevent pressure and flow from reaching the piston to be controlled. When movement of or pressure to the controlled piston is desired, the pressure will exceed the sequence valve setting, thereby opening the valve and allowing hydraulic supply to reach the piston. The method and apparatus also includes a directional valve movable to operate a pump as a fixed displacement pump during a controlled portion of a molding cycle, and movable to allow a proportional pressure controller to control the pump compensator during a hold portion of the cycle, so that the pump may operate at substantially reduced horse power during the major portion of the cycle.

The inventive concept is usable to move a piston in a cylinder to fill a cavity, and is also usable to operate a variable volume vane pump.

During a zero pressure or velocity portion of the cycle of operation, a spring biased spool is moved by hydraulic pressure to connect the pump output to a reservoir, and a spring biased sequence valve blocks application of hydraulic pressure to the press.

During a controlled-movement portion of the cycle, the spool is moved to allow a selected proportion of the pump output to reach the press, and such proportion is controlled by a feedback signal to provide pressure or velocity compensation as required.

During a hold or cure portion of the cycle, a directional valve is moved to allow a relief valve contained in the pump to operate so that the pump is changed from a fixed output pump to a variable output pump and can be operated at substantially reduced horsepower resulting in substantial energy savings. It is an object of the present invention to provide a method of controlling the speed of a piston at low velocities down to zero velocity without external resistance to movement.

It is a further object of the invention to utilize a hydraulic pump operable in fixed and variable output modes and a means for switching from one mode of operation to another, so that the pump may be operated in the variable output mode whenever possible to conserve energy.

Other objects and advantages of the invention will be apparent from the following detailed description and associated drawings.

DESCRIPTION OF THE PREFERRED EMBODIMENTS

Figure 1:
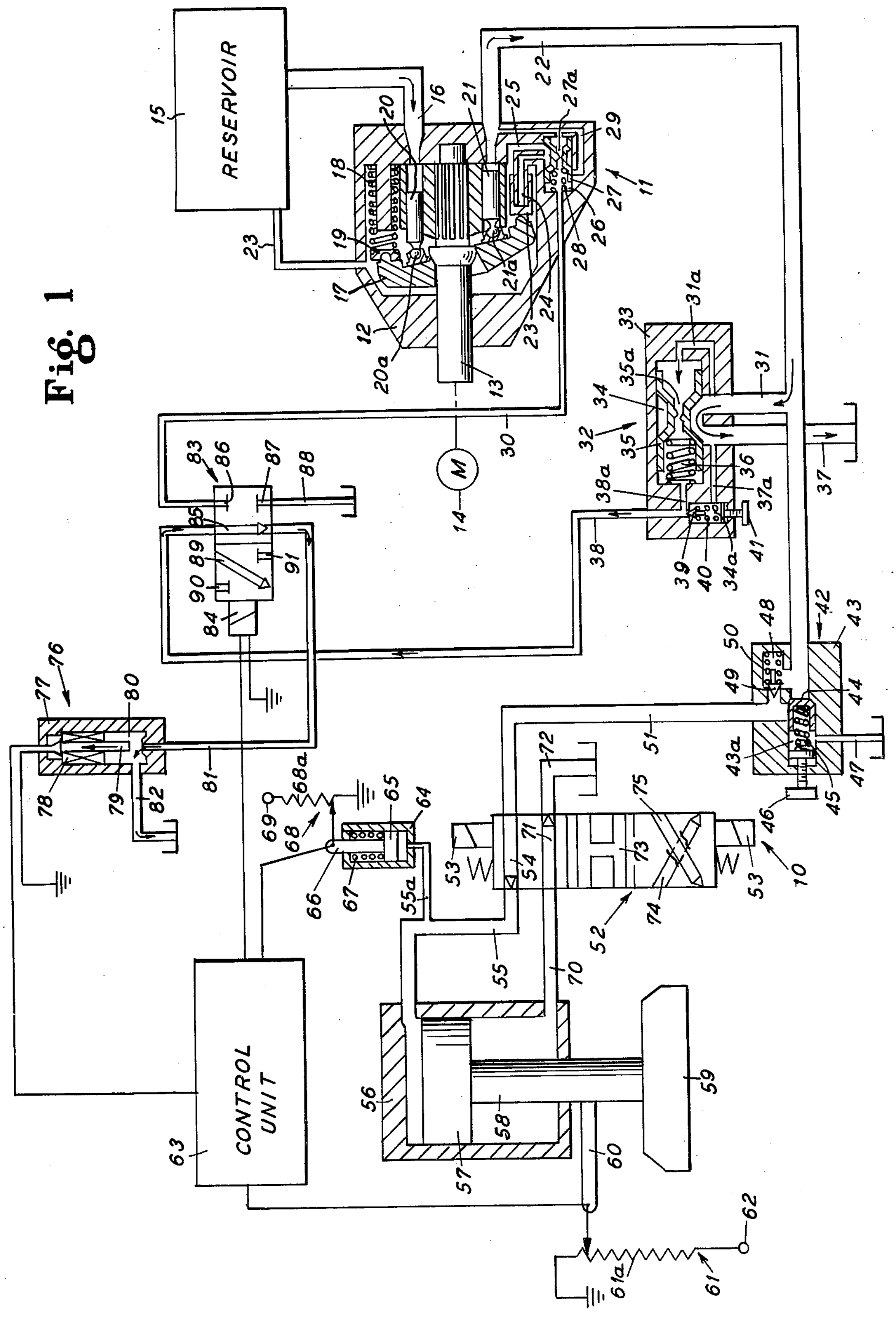
FIG. 1 is a schematic diagram showing a system for operation of a hydraulic press with a pump in a fixed output mode and the press in a zero pressure or zero velocity state.

A system for linear and nonlinear control of a hydraulic press constructed in accordance with the principles of the present invention is shown at 10 in FIG. 1. The system 10 has a pump 11 which is comprised of a housing 12, a rotatable shaft 13 and a drive motor 14. The pump 11 is supplied from a reservoir 15 by an inlet pipe 16.

The shaft 13 has mounted thereon a swash plate 17 which is normally biased at an angle by a spring 18 abutting a bearing plate 19 which is swivelably engaged with the swash plate 17. A pair of cooperatively reciprocating pistons 20 and 21 are respectively attached to the swash plate 17 by ball-joints *20a* and *21a*. Movement of the swash plate 17 thus moves the pistons 20 and 21 horizontally in their respective cylinders. A return line 23 flows back to the reservoir 15.

The pump 11 also contains a relief mechanism, operable as described below to control the output of the pump 11. The relief mechanism consists of a cap 23 which covers a channel 24 which communicates with a chamber 26. Inside of the chamber 26 is a cylindrical spool 27 having an orifice *27a*. The spool 27 is normally biased by a spring 28 to cover an outlet channel 29. The outlet channel 29 communicates with a main outlet line 22. A relief line 30 connects the chamber 26 to a directional valve 83 whose operation will be described below.

The main outlet line 22 connects the pump 11 to an inlet port 31 of a relief valve 32. The relief valve 32 consists of a housing 33 having a chamber 34 communicating with the inlet port 31 therein. Inside the chamber 34 is a slidable spool 35 having an orifice 35a. A spring 36 normally biases the spool 35 to cover an outlet port 37, which leads to a reservoir. An inlet channel 31a is connected to the inlet port 31 and leads to a side of the chamber 34 opposite the spring 36.

The relief valve 32 also contains an adjustment mechanism which consists of a chamber 34a and an adjustment screw 41, and a spring 40 which normally biases a plug 39 so that all of the output from an output channel 38a flows to a main output 38. This will act as an emergency relief valve. If line 38 is blocked in some manner, the pressure in channel 38a will overcome the force existing on the plug 39 by the action of the spring 40. This will allow channel 38a to connect with channel 37a and outlet port 37. The pressure drop through an orifice 35a will cause the spool 35 to shift as shown in FIG. 1 to allow the inlet port 31 to connect with the outlet port 37.

As does the relief line 30, the output 38 connects to a directional valve 83, the operation of which will be described below.

The pump outlet line 22 continues on to a sequencing valve 42. The sequencing valve 42 consists of a housing 43 having a chamber 43a therein. The chamber 43a connects the pump outlet 22 to a sequencing valve outlet 51, however, a cap 44 biased by a spring 45 normally blocks the connection. The bias of the spring 45 is adjustable by a screw 46. The chamber 43a also is connected to a reservoir by a channel 47.

A reverse flow check valve also contained in housing 42 has a chamber 48 connecting outlet 51 to the pump outlet 22. A plug 49 is normally biased by a spring 48 to block the connection. Should the pressure in outlet 51 exceed the pump outlet pressure in line 22 this pressure differential will displace the plug 49 thereby allowing the two pressures to become equal.

The sequencing valve outlet 51 flows to a directional valve 52, movable by solenoids 53. The solenoids 53 are operated by a control unit 63, although connections are not shown.

When the valve 52 is in the position shown in FIG. 1, the sequencing valve outlet 51 connects through a passage 54 to an input 55 to a press cylinder 56. The cylinder 56 contains a piston 57 movable by hydraulic pressure therein which has a shaft 58 connecting the piston 57 to a load 59. The load 59 may be the movable portion of any one of a number of molding presses, such as a compression press, and an injection press, or a transfer press. It will be understood that the inventive concept disclosed herein is not limited to use with molding apparatus, but has application to any hydraulically operated piston.

A cylinder outlet port 70 connects through a passage 71 in the directional valve 52 to a pipe 72 leading to a reservoir.

Figure 2:
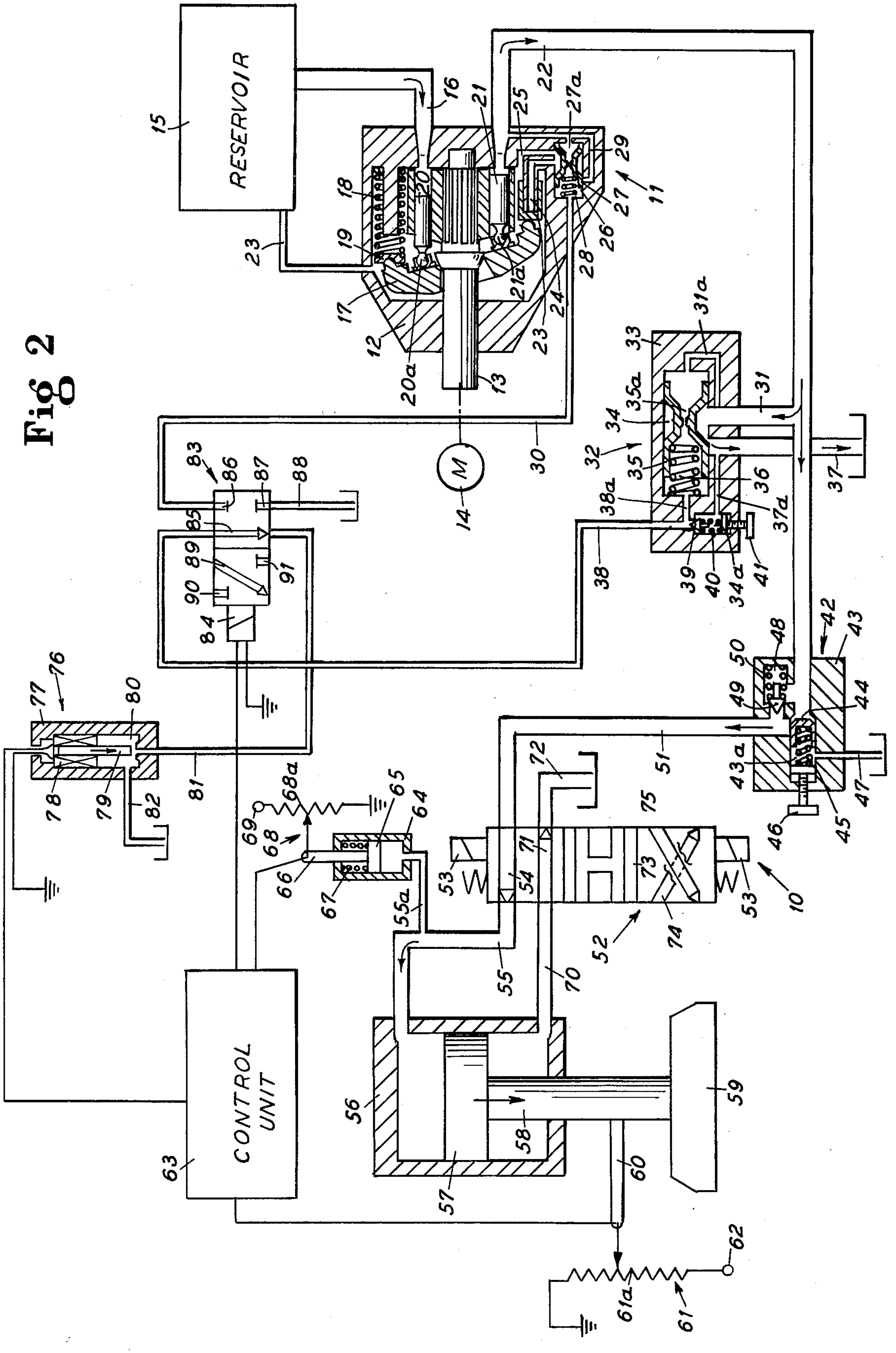
FIG. 2 is a schematic diagram of the system of FIG. 1 operating in a controlled pressure or controlled velocity mode.
Figure 3:
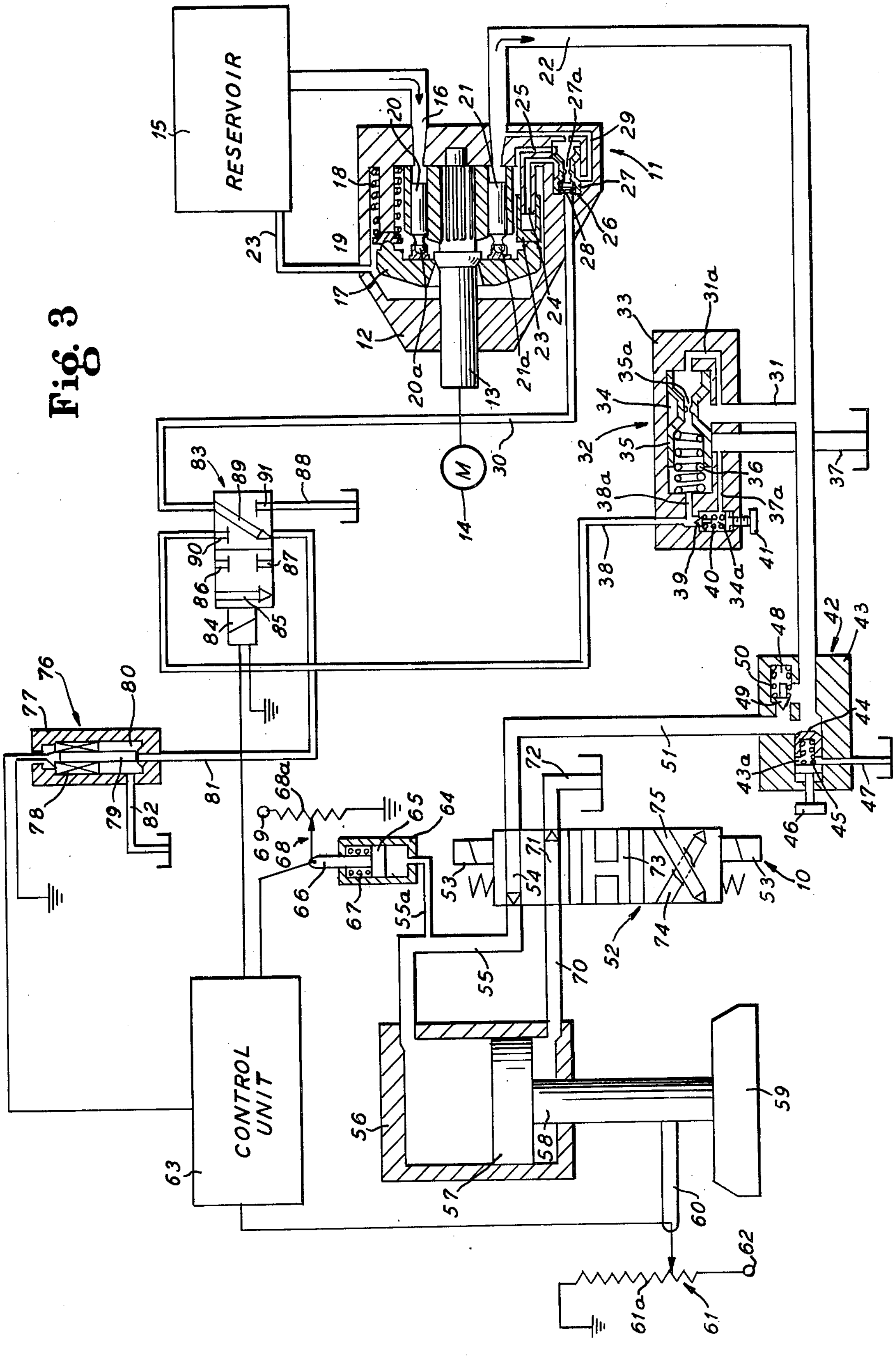
FIG. 3 is a schematic diagram of the system of the FIG. 1 operating with the pump in a variable output mode during a hold portion of the molding cycle.

The directional valve at 52 is shown in FIGS. 1, 2 and 3 in a position for operation of the piston 57 in the direction of the arrow shown in FIG. 2. The directional valve 52 may be moved to a neutral position so that the input 55 and the output 70 are connected by an H-shaped passage 73. During the return stroke of the piston 57, the directional valve 52 is moved into position so that what was previously the input 55 now becomes an output and is connected to the pipe 72 by a passage 74. The previous cylinder outlet 70 is utilzed as an input which receives hydraulic pressure from the sequencing valve outlet 51 through a passage 75 in the directional valve 52.

The cylinder 56 is equipped with a position sensor 61 and a pressure sensor 68. The position sensor 61 has a member schematically shown at 60 which is co-movable with the piston rod 58 to move along a potentiometer 61a which is connected to a power supply at 62. The output of the position sensor 61 is transmitted to the control unit 63.

The pressure sensor 68 has a passage 55a to allow the pressure in the cylinder input 55 to transfer to a cylinder 64 having a piston 65. The piston 65 is normally biased by a spring 67 against incoming pressure, and has a movable member 66 connected to a potentiometer 68a. The potentiometer 68a is connected to a power supply at 69 and has an output connected to the control unit 63.

Another relief valve 76 is also shown in FIG. 1, connected to the control unit 63. A signal from the control unit 63 actuates a solenoid coil 78 in a housing 77 to move a plunger 79 in a chamber 80 to open or block flow from an input 81 to an output 82, which flows to a reservoir.

The relief valve input 81 is connected to the directional valve 83 which has a passage 85 therein to connect the relief valve 32 output 38 to the relief valve 76 output 82 when the directional valve 83 is in the position shown in FIG. 1. In that position the directional valve 83 terminates the pump relief line 30 at 86 and at 87 terminates a passage 88 leading to the reservoir.

The directional valve 83 is movable by a solenoid 84 connected to the control unit 63 to the position shown in FIG. 3, thereby connecting the pump relief line 30 to the input 81 of the relief valve 76 and terminating the relief valve output 38 at 90 and again terminating a passage 88 at 91.

Operation of the system is as follows. When the directional valve 83 is at the position shown in FIG. 1, the pump relief line 30 is terminated at 86 creating an equal pressure on each side of the spool 27 so that it remains stationary, covering the channel 29.

The output of the pump 11 flows through the line 22 and through the relief valve 32 via the input 31. With the directional valve 83 in the position shown in FIG. 1, a direct line from the relief valve 32 to a reservoir is completed through the relief valve output 38, the passage 85, the input 81 to the second relief valve 76 and the output 82 thereof. The pressure differential due to flow through the orifice 35a is thus sufficient to move the spool 35 to overcome the bias of the spring 36 and the input 31 is connected to the outlet 37 of the relief valve 32 so that substantially the entire output of the pump 11 flows to a reservoir.

The bias of the spring 45 is adjusted by the screw 46 so that the pressure at the sequencing valve 42 is insufficient to overcome the bias of the spring 45 and move the cap 44. No pressure reaches the cylinder 56, so that the piston 57 remains stationary.

The next stage in the cycle of operation is shown in FIG. 2 wherein the movement of the piston 57 is controlled by the control unit 63 and associated feedback loop governed by the position sensor 61 or the pressure sensor 68. During this portion of the cycle of operation, the solenoid operated plunger 79 is selectively positioned in accordance with feedback commands from control unit 63 to restrict input to the relief valve 76. This equalizes pressure on both sides of the spool 35 so that the spring 36 moves the spool 35 to cover all or part of the outlet 37. This substantially increases the pressure from the pump output 22 which reaches the sequencing valve 42. The pressure is now sufficient to overcome the bias of the spring 45 so that a flow results through the sequencing valve 42, the sequencing valve output 51, the passage 54 and the cylinder input 55 to reach the cylinder 56. This pressure is also transferred to the pressure sensor through the channel 55*a* for monitoring. Movement of the plunger 79 in accordance with feedback signals from the control 63 will thus increase or decrease the amount of flow reaching the cylinder 56, and thus control the speed of movement of the piston 57.

After the material to be molded has been completely displaced in the mold, as indicated by the position sensor 61 or the pressure sensor 68 the control unit 63 activates the solenoid 84 to move the directional valve 83 to the position shown in FIG. 3. When this occurs, the relief line 30 from the pump 11 now communicates through the passage 89, the input 81 to relief valve 76 and the output 82 therefrom to a reservoir. This results in a flow through the orifice 27*a* of the spool 27 in the pump 11 so that the spool 27 moves to overcome the bias of the spring 28. This movement allows a portion of the pump output to be transmitted through the passage 29, the chamber 26 and the passage 24 to move the cap 23 to an extended position, shown by movement to the left in FIG. 3. Movement of the cap 23 swivelably moves the swash plate 17 to a vertical position as shown in FIG. 3.

When the pump operates as shown in FIG. 3, sufficient output flow is still provided to maintain the piston 57 in a desired position, however, the output is much less than occurred during that portion of the cycle controlling downward movement of the piston 57, so that a substantial energy saving is achieved, since the horse power required is proportional to the product of flow times pressure.

It will be apparent that although the control unit 63 may be programmed to move the directional valve 83 upon attainment of a preselected pressure or position reading received from the sensors 68 or 61 under worst-case conditions, such preselected value may never be achieved. The control unit may thus be provided with a timer which will automatically move the directional valve 83 after a designated period of time has elapsed without the selected pressure or position readings occurring.

Although various modifications and changes may be suggested by those skilled in the art, it is the intention of the inventor to embody within the patent warranted hereon all such changes and modifications as reasonably and properly come within the scope of his contribution to the art as set forth in the claims which follow.

I claim as my invention:

1. An apparatus for operating a hydraulic press having a control unit controlling a first pressure relief valve connected to a reservoir and a directional valve selectively movable to a first position to connect said first pressure relief valve to a second pressure relief valve which is connected to a hydraulic pump having an output connected to said press, said second pressure relief valve connected to said output to divert pressure from said output in selected amounts regulated by said first pressure relief valve over a cycle of operation.

2. The apparatus of claim 1 wherein said first pressure relief valve is controlled by said control unit in response to a feedback signal from a sensor which monitors the position of a piston in a cylinder in said press.

3. The apparatus of claim 1 wherein said first pressure relief valve is controlled by said control unit in response to a feedback signal from a sensor which monitors pressure in a piston and cylinder in said press.

4. The apparatus of claim 1 wherein said directional valve is selectively movable to a second position to connect a pressure compensation mechanism in said pump to said reservoir such that the pump output is variably controlled by said first pressure relief valve.

5. The apparatus of claim 4 wherein said pressure compensation mechanism is comprised of:

a means movable to connect said pump output to a tube terminating in a slidable cap whose position relative to said tube is determined by the amount of said pump output, said cap abutting a swivelable swash plate in said pump to move said swash plate from a normally angled position with respect to a drive shaft of said pump to a generally vertical position with respect to said drive shaft.

6. The apparatus of claim 1 wherein said first pressure relief valve consists of a solenoid energized by said control unit with a plunger movable to selectively vary a flow from an input to said valve to said reservoir by restricting flow from said input.

7. The apparatus of claim 1 wherein a sequencing valve is interconnected between said second pressure relief valve and said press, said sequencing valve having an adjustable means therein to block pressure and flow to said press until the amount of pressure developed by said second pressure relief valve exceeds a selected sequence valve setting.

8. The apparatus of claim 7 wherein said adjustable means in said sequencing valve is comprised of a spring having one end abutting a screw turnable to increase or decrease the bias of said spring, and having a second end covered by a slidable cap normally biased by said spring to block a passage in said sequencing valve connecting said pump and said press.

9. A method for operating a hydraulic press comprising the steps of:

operating a hydraulic pump to provide hydraulic pressure to operate said press;

operating a relief valve to divert a selected proportion of the pump output from the press;

selectively moving a directional valve to connect said relief valve to a second relief valve to regulate diversion of said pump output;

controlling said second relief valve by a feedback signal from said press; and moving said directional valve to connect a pressure compensator in said pump to said second relief valve to regulate output of said pump during a portion of a cycle of operation.

10. The method of claim 9 including the additional steps of:

monitoring the position of a piston in a cylinder in said press;

providing an electrical signal representing said position; and using said electrical signal for said feedback signal.

11. The method of claim 9 including the additional steps of:

monitoring the input pressure to said press;

providing an electrical signal representing said input pressure; and using said electrical signal for said feedback signal.

12. A pump and control circuit for operating a variable displacement hydraulic pump to deliver liquid in a first high volume delivery phase and a second low volume control pressure phase comprising in combination:

a variable displacement pump having a liquid output line;

a pressure responsive first valve means connected to said output line for changing the pump from maximum volume delivery to minimum volume delivery;

a control valve connected in said line and operative in a first position to deliver the pump output at a variable controlled flow rate and in a second position to deliver full pump output through said line, said pressure responsive first valve means being inoperative at said first position of the control valve;

and valve operating means operative to move said control valve to said second position simultaneously with making said first valve means operative.

13. A variable displacement pump operative in a first phase to deliver maximum output to a delivery line and in a second phase to deliver minimum output at high pressure comprising in combination:

a variable displacement pump having an output delivery line;

valve means in said output delivery line bypassing a controlled amount of liquid from the pump in said second phase to control the volume of pump delivery and bypassing no liquid in said first phase;

and pump control means inoperative in said first phase and operative in said second phase to cause the pump to deliver minimum delivery at a controlled high pressure.

14. The method of operating a variable displacement pump to obtain relatively high flow during a first phase and to obtain minimum flow at a high pressure during the second phase including the steps of:

operating the pump to maximum output in said second phase and controlling delivery by a variable opening bypass valve and closing said bypass valve during said first phase and regulating the pump displacement during said second phase as a function of discharge pressure.

* * * * *